(12) United States Patent
Graumann

(10) Patent No.: US 8,386,870 B2
(45) Date of Patent: Feb. 26, 2013

(54) FRACTIONAL HARQ RE-TRANSMISSION

(75) Inventor: Peter Graumann, Calgary (CA)

(73) Assignee: Wi-LAN, Inc., Ottawa, Ontario (CA)

( * ) Notice: Subject to any disclaimer, the term of this patent is extended or adjusted under 35 U.S.C. 154(b) by 904 days.

(21) Appl. No.: 12/497,458

(22) Filed: Jul. 2, 2009

(65) Prior Publication Data

US 2010/0037112 A1   Feb. 11, 2010

Related U.S. Application Data

(60) Provisional application No. 61/078,273, filed on Jul. 3, 2008.

(51) Int. Cl.
*G08C 25/00* (2006.01)
*H04L 1/18* (2006.01)

(52) U.S. Cl. ............................................ 714/748

(58) Field of Classification Search .................. 714/18, 714/748–749
See application file for complete search history.

(56) References Cited

U.S. PATENT DOCUMENTS

| | | | |
|---|---|---|---|
| 7,590,888 B2* | 9/2009 | Igarashi et al. | 714/18 |
| 8,103,929 B2* | 1/2012 | Kwon et al. | 714/749 |
| 2008/0101285 A1* | 5/2008 | Venkatachalam et al. | 370/329 |

OTHER PUBLICATIONS

Yanping et al., Performance analysis of multiple packets combining decoding in HARQ, 2005, IEEE, p. 1 to 4.*
Hua et al., A MAC layer ARQ tuning scheme to optimize TCP throughput in IEEE 802.11 Networks, 2007, IEEE, p. 1 to 4.*
Subramanian et al., Hybrid packet FEC and retransmission based erasure recovery mechnaisms (HARQ) for lossy networks: Analysis and design, Jan. 2007, IEEE, p. 1 to 8.*
Kim et al., CL_ARQ: Efficient ARQ for two layer retransmission schemes, Aug. 2007, IEEE, p. 1 to 6.*
Li et al., An Accurate HARQ scheme for LDPC, Mar. 2007, IEEE, p. 1 to 5.*

* cited by examiner

*Primary Examiner* — Shelly A Chase
(74) *Attorney, Agent, or Firm* — Volpe and Koenig, P.C.

(57) ABSTRACT

A mechanism is provided to allow an HARQ retransmission to more closely match the receiver's need for energy with the additional energy sent over the wireless link. In one aspect, the receiver sends the transmitter qualitative feedback which indicates to the transmitter an approximate amount of additional energy that the receiver needs to successfully decode the transmission.

20 Claims, 10 Drawing Sheets

Figure 4: DL HARQ flowchart

Figure 5: DL MAC level re-tx flowchart

Figure 6: UL HARQ flowchart – Client Side

Figure 7: UL HARQ flowchart – Base Station Side

Figure 8: UL MAC level re-tx flowchart – Client side

FRACTIONAL HARQ RE-TRANSMISSION

CROSS REFERENCE TO RELATED APPLICATIONS

This application claims the benefit of U.S. Provisional Application No. 61/078,273, filed Jul. 3, 2008, entitled "FRACTIONAL HARQ RE-TRANSMISSION," hereby incorporated by reference herein in its entirety.

BACKGROUND OF THE INVENTION

I. Field of the Invention

The invention relates to the field of wireless communications. More particularly, the invention relates to error control in a wireless communication system.

II. Related Art

In a wireless communication system, the most precious resource, in terms of both capital cost and system capacity, is often the wireless link itself. Thus, it is important to use the wireless link resources efficiently.

BRIEF SUMMARY OF THE INVENTION

In general HARQ operates with an all or nothing signaling mechanism. In other words, upon receipt of a packet, the receiver indicates to the transmitter whether the packet was successfully received or whether an error occurred, i.e. the packet was not successfully received. When an error occurs, a retransmission is executed whereby the entire original message is resent in its entirety. If the sum of the energy received in the first transmission and the energy received in the second transmission is much larger than is needed to successfully decode the data, precious wireless link resources have been used with no system performance gain. In fact, the additional bandwidth consumed and interference caused by retransmission may actually degrade the performance of other links in the system.

With fractional HARQ signaling, a mechanism is provided to allow the retransmission to more closely match the receiver's need for energy with the additional energy sent over the wireless link. In one aspect, the receiver sends the transmitter qualitative feedback which indicates to the transmitter an approximate amount of additional energy that the receiver needs to successfully decode the transmission. Rather than retransmit the original message at the same signal level, the transmitter may send a lesser amount of energy or a smaller message or both, thereby enhancing the overall system performance and efficiency.

DETAILED DESCRIPTION OF THE INVENTION

Figure 1:
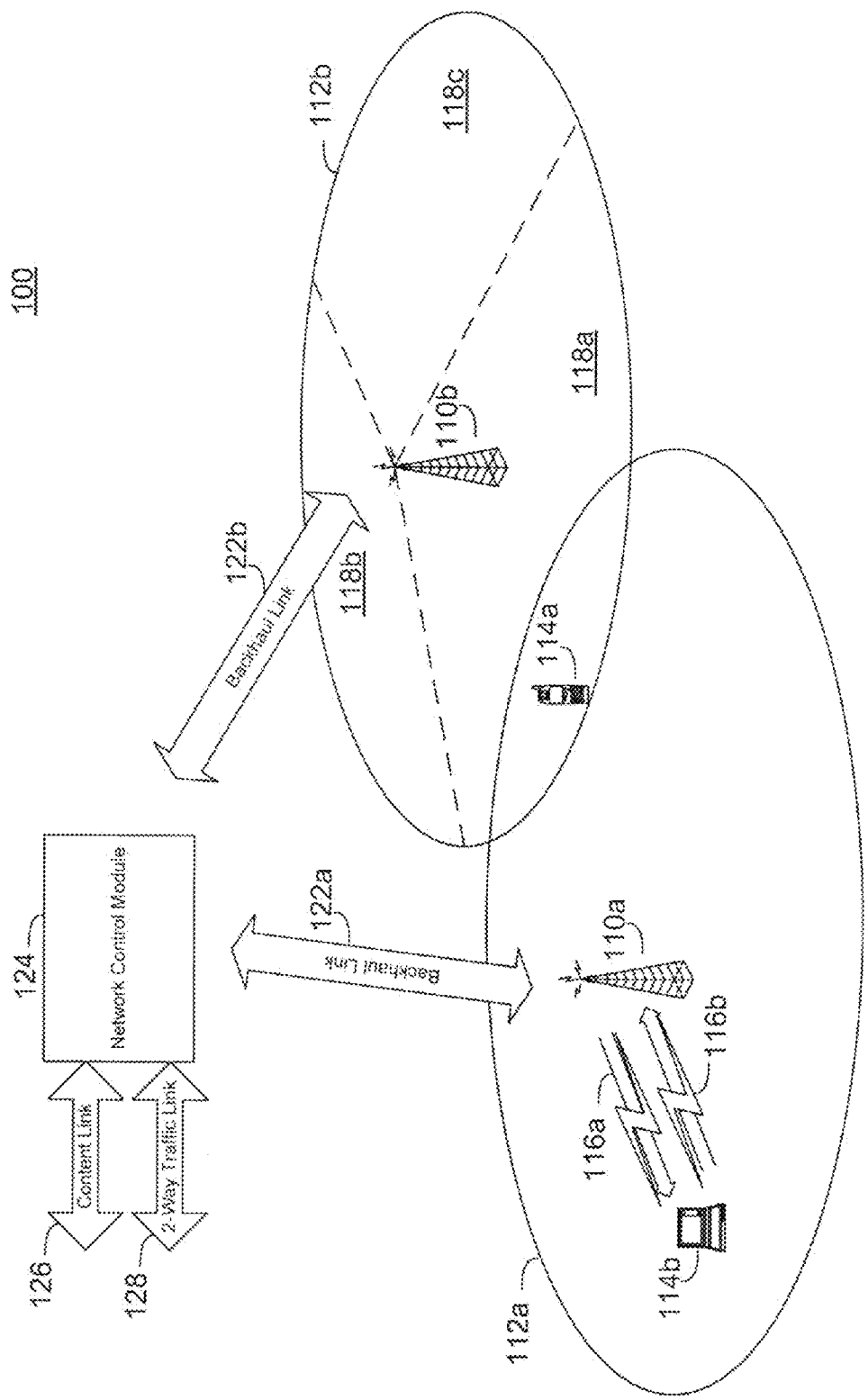
FIG. 1 is a simplified functional block diagram of an embodiment of a wireless communication system.

The physical (PHY) layer is the lowest layer protocol layer in a communication system. It provides the means of transmitting raw bits over the communication link. In a wireless system, the PHY layer provides an interface between the medium access layer (MAC) and the wireless link. It performs such functions as electromagnetic spectrum frequency allocation, specification of signal strength and the like. It also provides the modulation and coding scheme, forward error correction and the like.

At the transmitting station, the PHY layer receives MAC packet data units (PDUs) from the MAC layer. Typically the MAC PDUs are smaller than the largest available PHY layer packet. As such, the PHY layer at the transmitting station may combine multiple MAC PDUs into one PHY packet before transmitting the PHY packet over the wireless link. The PHY layer at the receiving station extracts the corresponding MAC PDUs and passes them to the MAC layer in the receiving station.

The MAC layer provides addressing and channel access control mechanisms that make it possible for several client stations to communicate with a base station. The MAC layer is typically largely unaware of the PHY layer operation and, as such, a common MAC layer may be used in systems using disparate PHY layer techniques. For example, the MAC layer is unaware of the packing of multiple MAC PDUs into one PHY packet at the PHY layer.

Automatic Repeat-Request (ARQ) is an error control method for data transmission. ARQ can be applied to either the MAC layer or the PHY layer. It uses acknowledgments (ACKs), negative acknowledgments (NACKs) and timeouts to achieve reliable data transmission. An acknowledgment indicates that a receiving station has correctly received a MAC PDU or PHY packet. A negative acknowledgment indicates that the receiving station was unable to properly receive a MAC PDU or PHY packet. A timeout is a time counter that is activated when the transmitting station sends the PDU or packet and expires at the latest point in time at which the transmitting station reasonably expects to receive an ACK from the receiving station. If the transmitting station does not receive an acknowledgment before the timeout expires, it usually re-transmits the PDU or packet until it receives an acknowledgment or a predefined number of re-transmissions have occurred.

Hybrid ARQ (HARQ) is a variation of ARQ which has better performance, particularly over wireless channels, at the cost of increased implementation complexity. HARQ can be applied to the PHY layer only. HARQ also uses ACKs or NACKs as receiving or non-receiving indicators. Some HARQ protocols also use timeouts. However, according to HARQ operation, when a receiving station fails to properly receive a packet, it saves the energy associated with the failed transmission and combines it with the energy received in subsequent transmissions of the same packet.

Forward Error Correction (FEC) is a system of error control for data transmission, whereby the transmitter adds redundant data to the wireless link message according to a predetermined algorithm. The redundant data allows the receiver to detect and correct errors, within some bound. Each redundant bit is a complex function of many original information bits. The original information may or may not appear in the encoded output. Codes that include the unmodified input in the output are called systematic, while those that do not are called nonsystematic. Using FEC, a receiver can accurately reproduce the transmitted information, even if some PHY layer errors occur. In fact, the receiver can accurately reproduce the transmitted information even if only a portion of the PHY layer bits are transmitted.

Convolution Turbo Code (CTC) is a type of error-correcting encoding used in FEC in which (a) each m-bit information symbol to be encoded is transformed into an n-bit symbol, where m/n is the code rate ($n \geq m$) and (b) the transformation is a function of the last k information symbols, where k is the constraint length of the code.

Signal-to-noise ratio (often abbreviated SNR or S/N) is defined as the ratio of a signal power to the noise power corrupting the signal. Usually SNR represents the power ratio between a signal (meaningful information) and the background noise. The higher the ratio, the less obtrusive the background noise is.

The carrier-to-interference-and-noise ratio (CINR) is the quotient (C/(N+I)) between the average received modulated carrier power (C) and the average received co-channel interference power (I) received from other transmitters summed with the environmental noise(N), such as thermal noise or noise from outside the system. The CINR ratio is an important measure in an interference limited systems, such as cellular radio systems where frequency channels are reused to achieve high system capacity.

A cyclic redundancy check (CRC) is a type of function that takes as input a data stream of any length, and produces as output a value of a certain space. The term CRC is often used to denote either the function or the function's output. A CRC can be used as a checksum to detect errors introduced into data during transmission. CRCs are popular because they are simple to implement in binary hardware, are easy to analyze mathematically, and are particularly good at detecting common errors caused by noise in transmission channels.

A low-density parity-check code (LDPC code) is a forward error correcting code for transmitting a message over a noisy transmission channel. While LDPC and other error correcting codes cannot guarantee perfect transmission, the probability of lost information can be made as small as desired. LDPC was the first code to allow data transmission rates close to the theoretical maximum, the Shannon Limit.

FIG. 1 is a simplified functional block diagram of an embodiment of a wireless communication system 100. The wireless communication system 100 includes a plurality of base stations 110a and 110b, each supporting a corresponding service or coverage area 112a and 112b. The base stations are capable of communicating with wireless devices within their coverage areas. For example, the first base station 110a is capable of wirelessly communicating with a first client station 114a and a second client station 114b within the coverage area 112a. The first client station 114a is also within the coverage area 112b and is capable of communicating with the second base station 110b. In this description, the communication path from the base station to the client station is referred to as a downlink (DL) 116a and the communication path from the client station to the base station is referred to as an uplink (UL) 116b.

Although for simplicity only two base stations are shown in FIG. 1, a typical wireless communication system 100 includes a much larger number of base stations. The base stations 110a and 110b can be configured as cellular base station transceiver subsystems, gateways, access points, radio frequency (RF) repeaters, frame repeaters, nodes or any wireless network entry point.

The base stations 110a and 110b can be configured to support an omni-directional coverage area or a sectored coverage area. For example, the second base station 110b is depicted as supporting the sectored coverage area 112b. The coverage area 112b is depicted as having three sectors, 118a, 118b, and 118c. In typical embodiments, the second base station 110b treats each sector 118 as effectively a distinct coverage area.

Although only two client stations 114a and 114b are shown in the wireless communication system 100, typical systems are configured to support a large number of client stations. The client stations 114a and 114b can be mobile, nomadic or stationary units. The client stations 114a and 114b are often referred to as, for example, mobile stations, mobile units, subscriber stations, wireless terminals or the like. A client station can be, for example, a wireless handheld device, a vehicle mounted device, a portable device, client premise equipment, a fixed location device, a wireless plug-in accessory or the like. In some cases, a client station can take the form of a handheld computer, notebook computer, wireless telephone, personal digital assistant, wireless email device, personal media player, meter reading equipment or the like in may include a display mechanism, microphone, speaker and memory.

In a typical system, the base stations 110a and 110b also communicate with each other and a network control module 124 over backhaul links 122a and 122b. The backhaul links 122a and 122b may include wired and wireless communication links. The network control module 124 provides network administration and coordination as well as other overhead, coupling and supervisory functions for the wireless communication system 100.

In some embodiments, the wireless communication system 100 can be configured to support both bidirectional communication and unidirectional communication. In a bidirectional network, the client station is capable of both receiving information from and providing information to the wireless communications network. Applications operating over the bidirectional communications channel include traditional voice and data applications. In a unidirectional network, the client station is capable of receiving information from the wireless communications network but may have limited or no ability to provide information to the network. Applications operating over the unidirectional communications channel include broadcast and multicast applications. In one embodiment, the wireless system 100 supports both bidirectional and unidirectional communications. In such an embodiment, the network control module 124 is also coupled to external entities via, for example, content link 126 and two-way traffic link 128.

In one example, the wireless communication system 100 is configured to use Orthogonal Frequency Division Multiple Access (OFDMA) communication techniques. For example, the wireless communication system 100 can be configured to substantially comply with a standard system specification, such as IEEE 802.16 and its progeny or some other wireless standard such as, for example, WiBro, WiFi, Long Term Evolution (LTE) or it may be a proprietary system. The ideas described herein are not limited to application to OFDMA systems. The description in the context of an OFDMA system is offered for the purposes of providing a particular example only.

Each base station, for example 110a, can supervise and control the communications within its respective coverage area 112a. Each active client station (e.g., 130a) registers with a base station (e.g., 110a) upon entry into its coverage area (e.g., 112a). Typically, the client station 130a can notify the base station 110a of its presence upon entry into the coverage area 112a, and the base station 110a can interrogate the client station 130a to determine the capabilities of the client station 130a.

Figure 2:
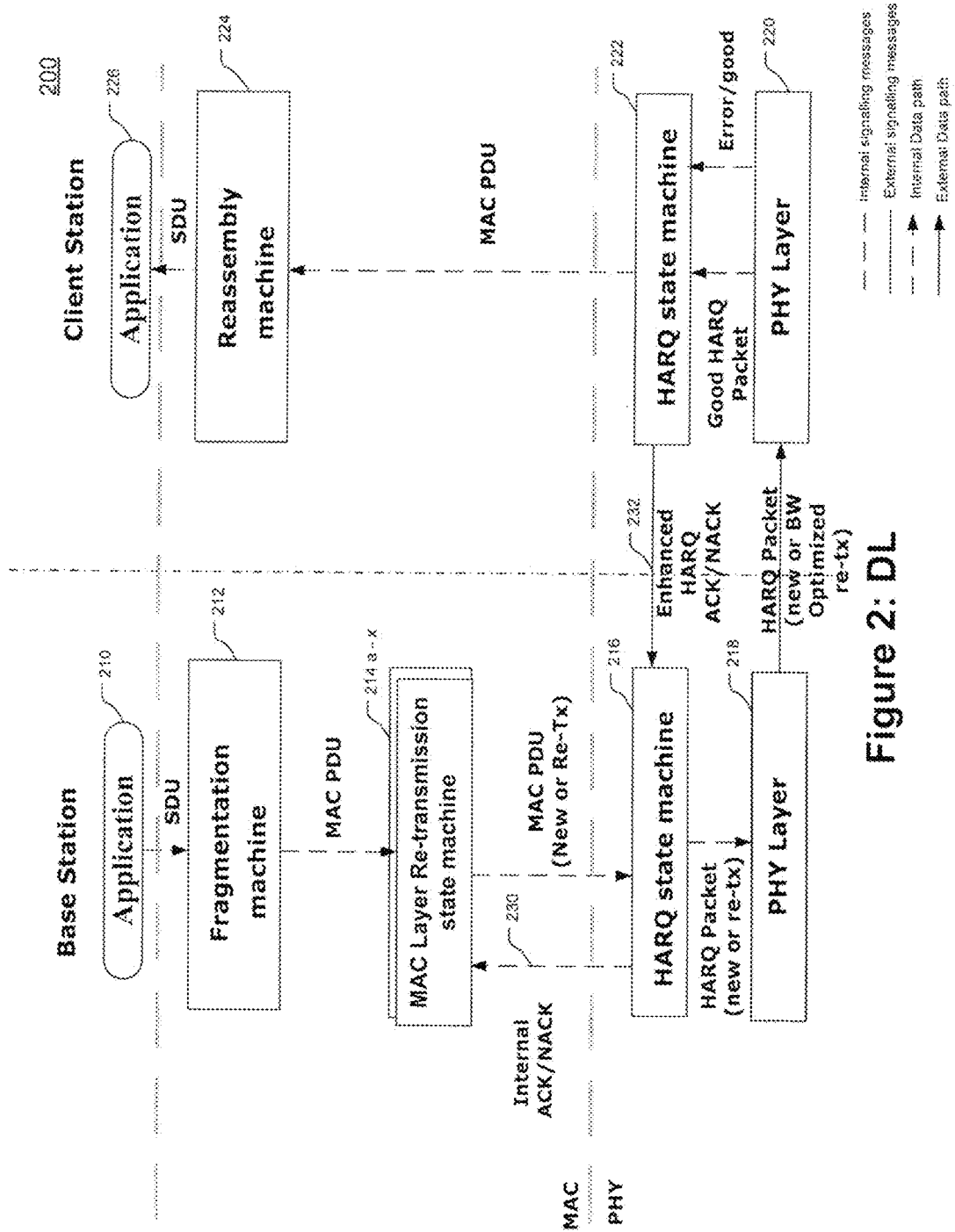
FIG. 2 is a block diagram illustrating a downlink service flow configuration that can be implemented in the system of FIG. 1 wherein one embodiment of the fractional HARQ re-transmission is implemented.
Figure 3:
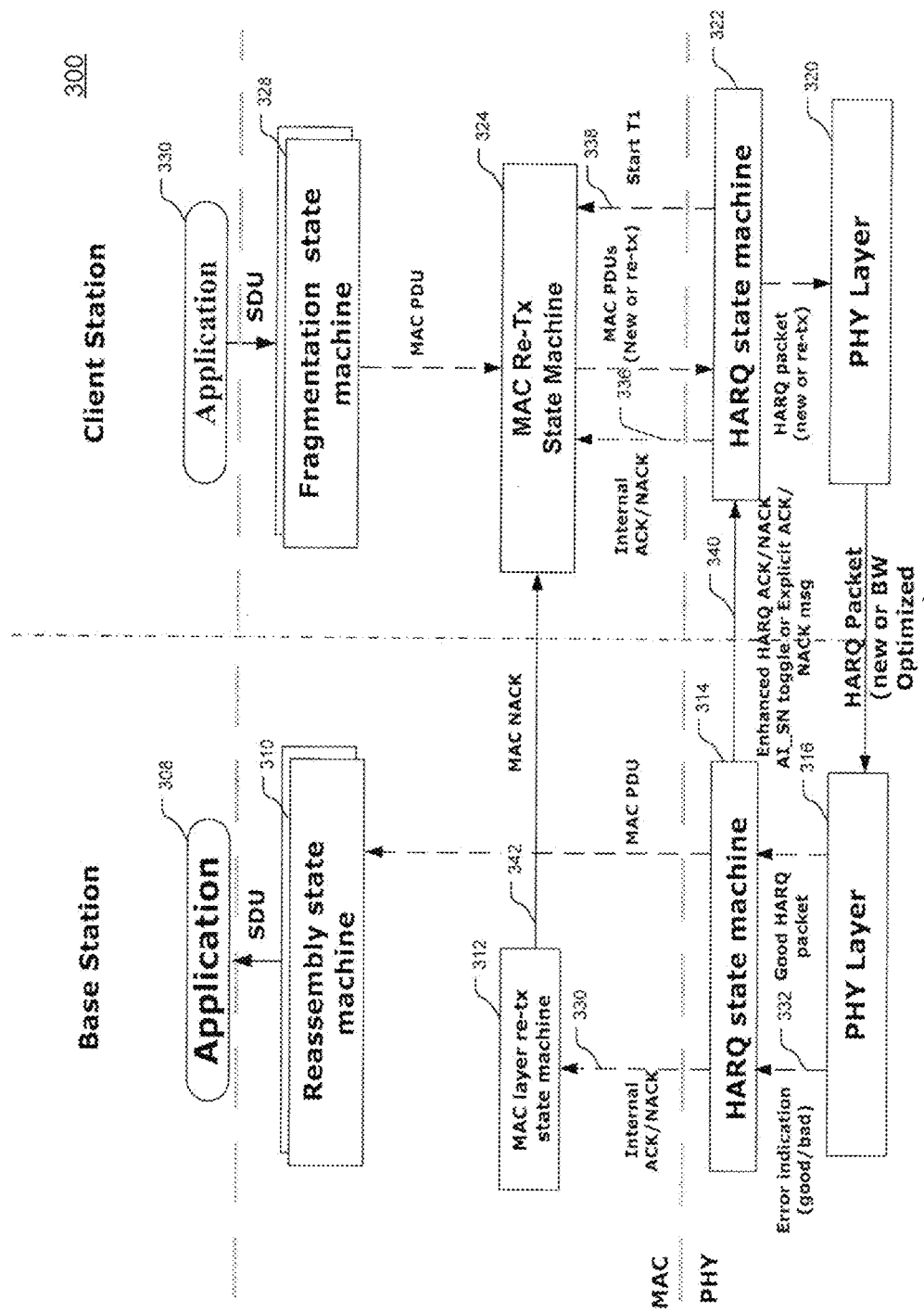
FIG. 3 is a block diagram illustrating an uplink service flow configuration that can be implemented in the system of FIG. 1 wherein one embodiment of the fractional HARQ re-transmission is implemented.

When, for example, the client station 130a establishes a service flow, such as an Internet connection or a voice connection, with the base station 110a, a HARQ MAC layer service flow state machine as well as a HARQ PHY layer service flow state machine are established in both the client station 130a and the base station 110a, as illustrated in FIGS. 2-3. The HARQ state machines allow error correction to be applied to the wireless link.

In general HARQ operates with an all or nothing signaling mechanism from the receiver indicating that the full packet was successfully received or that a full retransmission is required. With a fractional ACK/NACK signal, a mechanism can be provided where a receiver can describe the level of retransmission that should be required to successfully complete a HARQ transmission.

The fractional return signal can be generated locally by a receiver based on metrics generated by the decoders that were performing Forward Error Correction (FEC) on the receiver information. In particular while decoding Convolution Turbo Coded (CTC) or LDPC FEC blocks, quality metrics from the internal operation of the decoder can be extracted. Anther metric might be the instantaneous SNR measured while receiving the HARQ packet and the accumulated CINR so far for the HARQ packet. The UL control channel for HARQ can be designed to support multiple level signaling, for example, a 3 or 4 level signaling.

The benefits of the fractional feedback signaling come from the reduced retransmission rate and come at the cost of increased signaling overhead. However, even with the increased complexity in management and signaling associated with fractional HARQ, there can be an overall net throughput gain of about 10%-20%.

A full HARQ channel of information contains a user data portion and a CRC checksum. The CRC checksum values for a HARQ channel must pass for the receiver to signal an "ACK" back to the transmitter. An ACK'd channel can be considered to be closed and the channel can now be used by the transmitter for new information.

If the Checksums do not pass, a "NACK" is signaled back to the transmitter. A NACK may be signaled expressly or implicitly. The NACK indication can be interpreted by the transmitter as requesting a retransmission of the information for that HARQ channel. In the receiver, each subsequent retransmission is summed with the stored result for that HARQ channel at the receiver and the same checksum pass/ fail condition is applied resulting in another ACK/NACK signal back to the transmitter.

Figure 4:
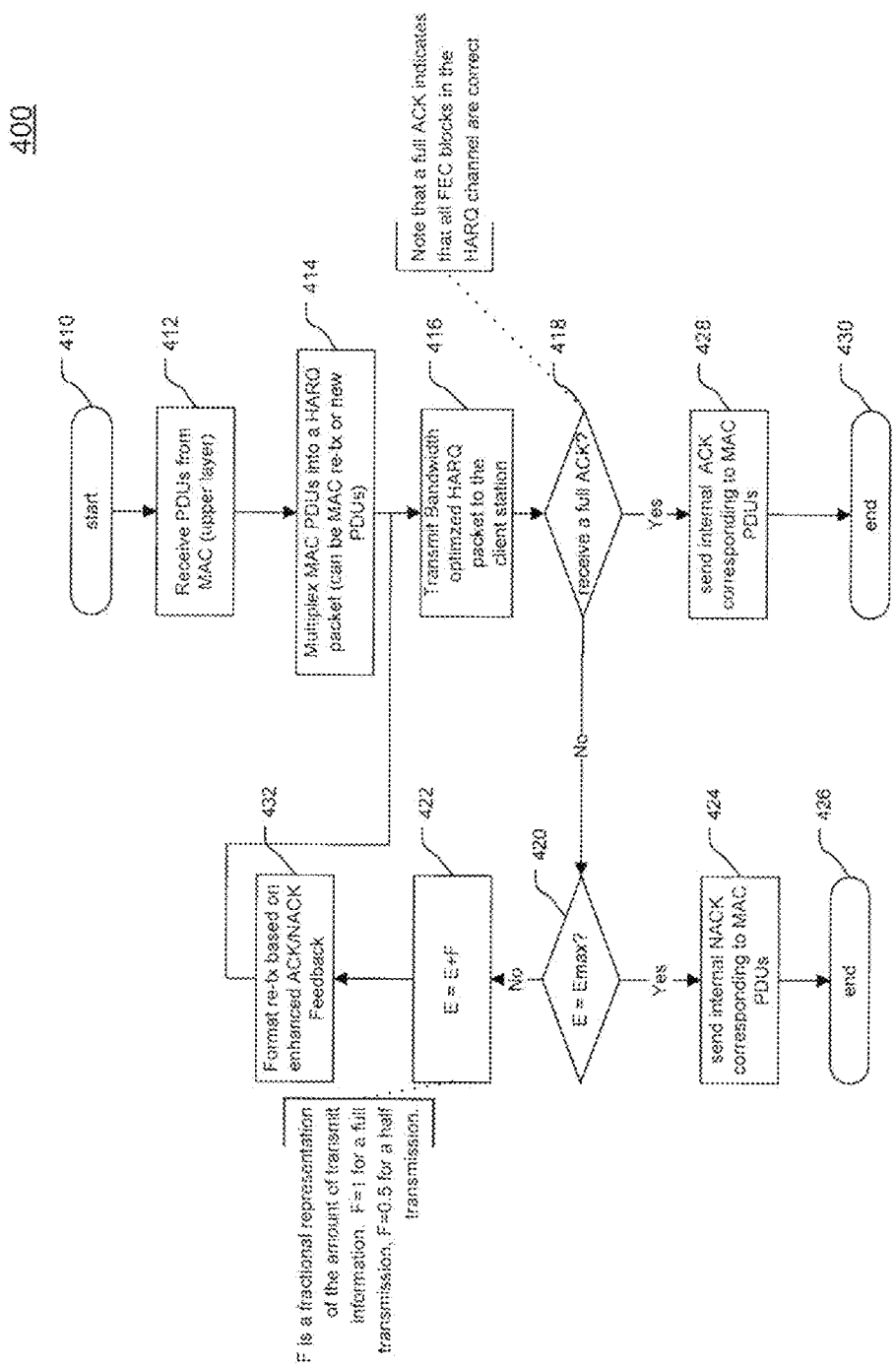
FIG. 4 is a simplified flowchart showing physical layer operation within the base station for the downlink (DL) transmission wherein one embodiment of the fractional HARQ re-transmission is implemented.
Figure 5:
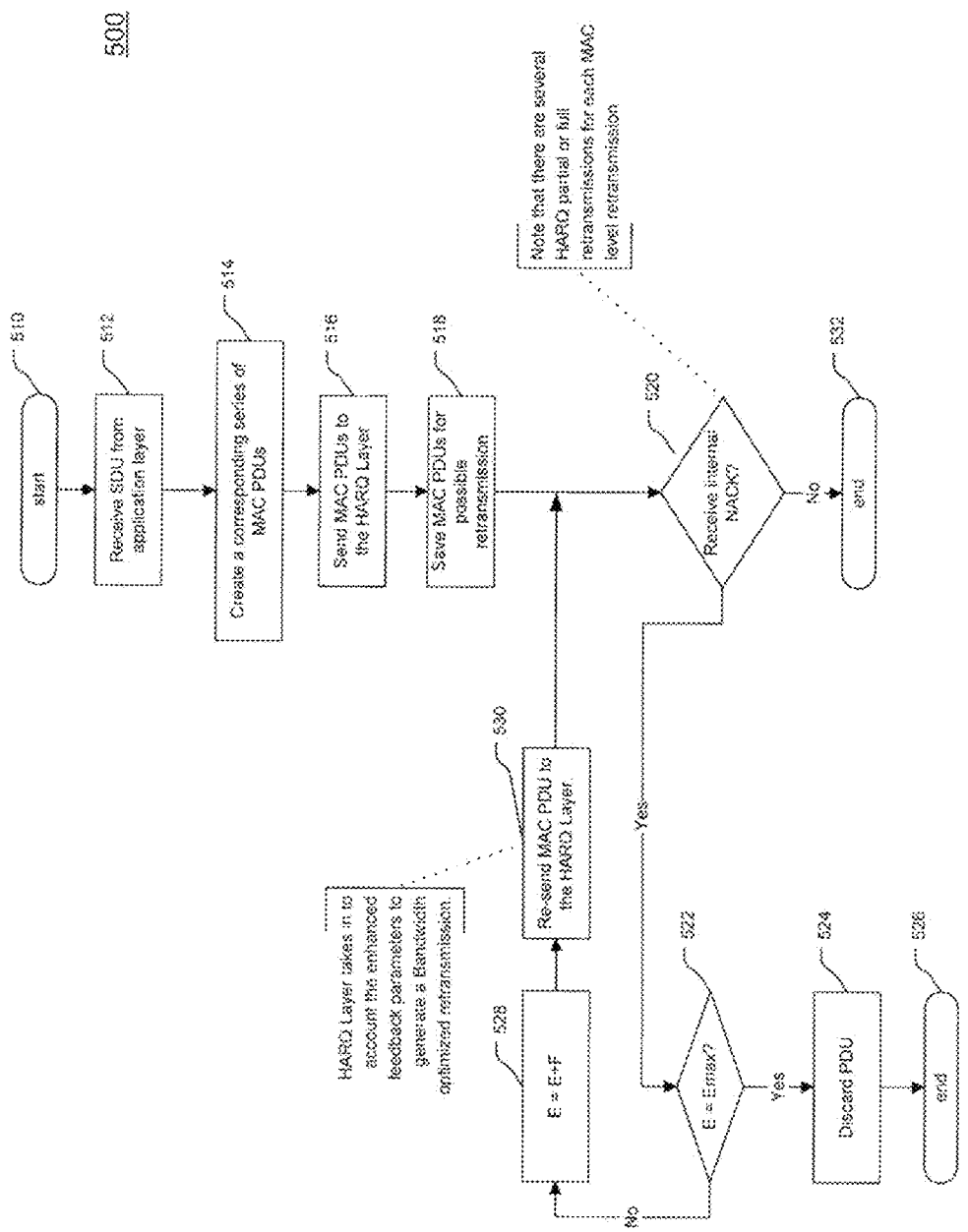
FIG. 5 is an exemplary flow chart showing MAC layer operation at the base station in the DL transmission wherein one embodiment of the fractional HARQ re-transmission is implemented.

With reference to FIGS. 2, 4 and 5, an error control method in the DL operation according is described. FIG. 2 is a block diagram illustrating a downlink service flow configuration 200 for error control from both the base station and client station perspectives. FIG. 4 is a simplified flow chart showing DL PHY layer operation 400 in the base station. FIG. 5 is a flow chart showing DL MAC layer operation 500 at the base station.

As seen in FIG. 2, for DL operation, the MAC layer of the base station comprises an application layer 210 configured to send one or more service data units (SDU) to a fragmentation machine 212 where a series of MAC PDUs are created based on the received SDUs. The base station also comprises a MAC layer re-transmission state machine 214 that receives the MAC PDUs from the fragmentation machine and sends to a HARQ state machine 216 in the PHY layer 218 from which the MAC PDUs are sent to the client station. On the other hand, in the client station side, there is also a PHY layer 220 and HARQ state machine 222 from which the MAC PDUs are sent to a reassembly machine 224. The reassembly machine 224 then processes and reassembles the PDUs into SDUs to pass onto the application layer 226. During the above-mentioned transmission of data packets and interaction of each component, certain errors may occur. Below is described an exemplary DL service flow including error control at the base station.

The service flow starts in block 510 of FIG. 5. In block 512, the fragmentation machine 212 receives a service data unit (SDU) from the application layer 210. The fragmentation machine 212 creates a series of MAC PDUs in block 514 which are received by the MAC layer retransmission machine 214. Each PDU is assigned a unique service flow identifier (SFID) depending on its associated service or data connection. For example, if the client station is participating in a voice call while surfing the Internet, each of the voice and data connections is assigned a unique service flow identifier (SFID). In practice, separate MAC layer retransmission state machines (e.g., #a . . . , #x) can be used to further transmit the MAC PDUs to the HARQ state machine 216. In doing so, each MAC layer retransmission state machine 214 (e.g., #a, . . . , #x) will send one or more MAC PDUs of the same SFID to the HARQ state machine 216 through a different connection or service flow.

In block 518, the MAC layer retransmission state machine 214 saves a copy of the MAC PDUs for possible full or fractional retransmission in case of transmission error or failure. In block 520, the MAC layer retransmission state machine 214 determines whether an internal NACK 230, which may be a multi-level NACK, was received from the HARQ state machine 216. If not, after a predetermined time has expired, the service flow for this particular MAC PDU ends assuming it has been successfully received by the client station, although the general process may continue for other MAC PDUs associated with the SDU. When the timer expires, the MAC layer retransmission state machine 214 no longer needs to save this particular PDU for possible retransmission.

In block 520, if an internal NACK is received from the HARQ state machine before the timer expires, the service flow with regard to the particular MAC PDU continues to block 522 in which the PDU-associated MAC layer retransmission state machine 214 determines whether a maximum number of retransmissions has occurred with respect to the current PDU. If not, the flow continues to block 528 in which the retransmission counter is incremented, and may be incremented by a fractional amount. In block 530, the MAC layer retransmission state machine 214 resends the MAC PDU or portion specified by the fractional HARQ. If in block 522 the maximum number of retransmissions has been reached, the MAC layer retransmission state machine 214 discards this particular MAC PDU in block 524 and flow ends in block 526 for the particular MAC PDU, although the general flow may continue for other MAC PDUs associated with the SDU. In such a case, the application 210 will also experience error.

Referring now to FIG. 4, the DL PHY layer flow at the base station starts in block 410. In block 412, the HARQ state machine 216 receives the MAC PDU, such may have been sent by the MAC layer retransmission state machine 214 in either block 516 or 530 of FIG. 5. In one embodiment, the HARQ state machine 216 is capable of combining multiple MAC PDUs into one HARQ packet, as shown in block 414. In block 416, the core physical layer 218 transmits the HARQ packet over the wireless link to the client station. The HARQ state machine 216 awaits a response from the HARQ state machine 222 within the client station. If the HARQ state machine 216 receives any indication of NACK in block 418, the flow continues to block 420, otherwise the HARQ packet is ACKed and the flow proceeds to block 428.

In block 420, the HARQ state machine 216 determines whether a maximum number of retransmissions has been exceeded. If not, the flow continues to block 422 where the retransmission error count is incremented, and may be incremented by a fractional value. Subsequently, the HARQ state machine 216 retransmits the HARQ packet or fractional portion indicated by a multi-level acknowledgement to the client station, as the flow goes back to block 416.

If in block 420 the maximum number of retransmissions has been reached, the flow continues to block 424 in which the HARQ state machine 216 sends an internal NACK 230 to the MAC layer retransmission state machine 214 to indicate transmission error of the MAC PDUs and the flow ends in block 426. The creation of the internal NACK by the HARQ state machine 216 based on the physical layer error correction mechanisms obviates the need for the transmission of a MAC NACK over the wireless link, thus preserving the precious wireless link resources.

If in block 418, no HARQ NACK is received before a timer within the HARQ state machine 216 expires, the flow continues to block 428. In block 428, the HARQ state machine 216 sends an internal ACK 230 to MAC layer retransmission state machine 214. The creation of the internal ACK by the HARQ state machine 216 based on the physical layer error correction mechanisms obviates the need for the transmission of a MAC ACK over the wireless link, thus preserving the precious wireless link resources.

In FIG. 2, on the client station side, the core physical layer 220 responds in a HARQ manner sending error indications and good HARQ packets to the HARQ state machine 222. The error indications may request retransmission of an entire HARQ packet or only a fraction of the HARQ packet. In the operation as described in FIGS. 4 and 5, only successfully received MAC PDUs are passed from the HARQ state machine to the upper layers. Thus, the client station need not include a MAC layer retransmission state machine and the MAC PDUs from the HARQ state machine 222 can be passed directly to the reassembly state machine 224. The reassembly machine 224 reassembles the SDU and passes it to a corresponding application layer 226.

Although the HARQ ACK/NACK external signaling 232 is shown as flowing from the HARQ state machine 222 in the client station to the HARQ state machine 216 in the base station directly, according to industry standard practice in such a representation, the HARQ ACK/NACK message is typically transmitted via the core physical layers 218, 220.

As generally illustrated in FIGS. 2, 4, and 5, in the DL, the base station is the transmitter and the client station is the receiver. The BS relies on HARQ ACK/NACKs to drive MAC level retransmissions (ARQ). The BS keeps track of MAC PDUs mapping to HARQ packets and whether several MAC flows are multiplexed onto the same HARQ packet. The ARQ state machine can be advanced based on HARQ ACK/NACK. A window size of the NACK based ARQ can be managed using the Fragmentation Sequence Number (FSN).

If the HARQ packet is ACK'ed by the client station, the BS sends an internal ACK to the ARQ state machine for the associated MAC PDU. If the HARQ process is terminated with an unsuccessful outcome (independent of the maximum HARQ retransmission parameter), the BS sends an internal NACK indication for the associated PDUs. HARQ packets may carry multiple MAC flows. In this case, the base station may send internal ACK/NACK indications to multiple MAC flows state machines.

Figure 6:
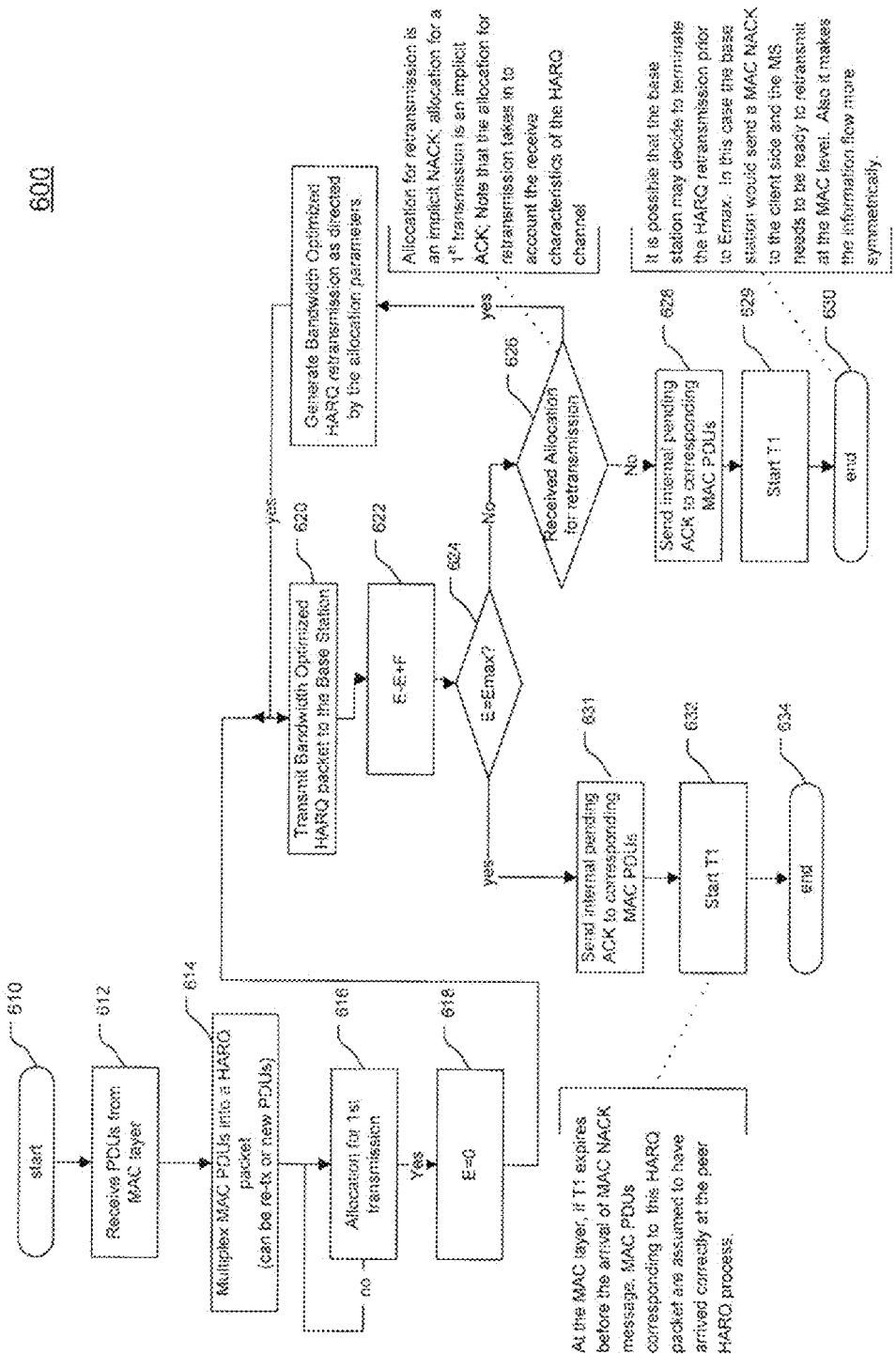
FIG. 6 is an exemplary flow chart showing physical layer operation on the client station or transmitting station during the uplink (UL) operation wherein one embodiment of the fractional HARQ re-transmission is implemented.
Figure 7:
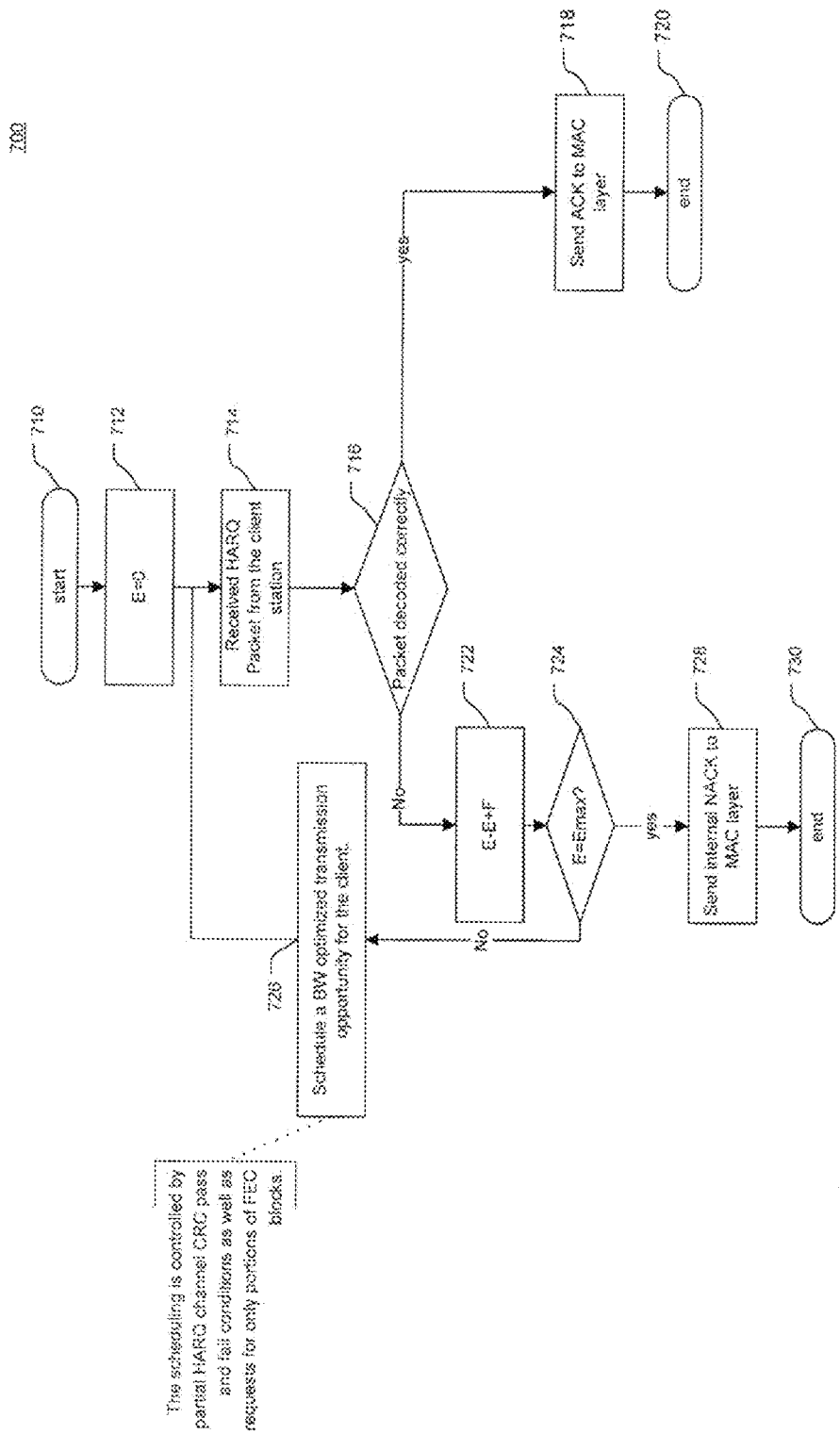
FIG. 7 is an exemplary flow chart showing physical layer operation on the base station (receiving station) during the UL operation wherein one embodiment of the fractional HARQ re-transmission is implemented.
Figure 8:
FIG. 8 is an exemplary flow chart showing MAC layer operation at the client station (transmitting station) during the UL operation wherein one embodiment of the fractional HARQ re-transmission is implemented.

Referring now to FIGS. 3, 6-8, an exemplary UL flow between the client station and base station with improved error control mechanisms is herein described in detail. FIG. 3 is a block diagram illustrating an UL service flow configuration 300 from both base station and client station perspectives. FIG. 6 is an exemplary flow chart showing UL PHY layer operation 600 in the client station (transmitting station). FIG. 7 is an exemplary flow chart showing UL PHY layer operation 700 on the base station (receiving station). FIG. 8 is an exemplary flow chart showing UL MAC layer operation 800 at the client station (transmitting station).

As shown in FIG. 3, for UL operation, the client station comprises an application layer 330 that sends SDUs to a fragmentation state machine 328 where a series of MAC PDUs are created. The client station also comprises a MAC retransmission state machine 324 that receives MAC PDUs from the fragmentation state machine 328 and then sends them to a HARQ state machine 322 and a core PHY layer 320. On the base station side, in the PHY level there are a core PHY layer 316 and HARQ state machine 314 in communication with the client station. The base station also comprises a MAC layer retransmission state machine 312, a reassembly state machine 310 receiving MAC PDUs from the HARQ state machine 314 and reassembling them into SDUs, and an application layer 308 receiving SDUs from the reassembly state machine 310. Detailed transmission and interaction between the aforementioned components are described below, referring to the UL service flows in FIGS. 6-8.

The UL service flow starts at the MAC layer of the client station in block 810 of FIG. 8. In block 812, in the client station the fragmentation state machine 328 receives a service data unit (SDU) from the application layer 330. In block 814, the fragmentation state machine 328 creates a series of MAC PDUs based on the received SDU and provides them to the MAC retransmission state machine 324. In block 816, the MAC retransmission state machine 324 sends a MAC PDU to the HARQ state machine 322. In block 818, the MAC retransmission state machine 324 saves the MAC PDU value for possible retransmission, either as a full HARQ packet or a fractional HARQ packet. In block 820, the MAC retransmission state machine 324 sets a timer and monitors whether a NACK message is received before the timer expires. If a NACK is not received before the timer expires, the MAC retransmission state machine 324 assumes that this particular MAC PDU was successfully delivered across the wireless link to the base station and the flow ends for the MAC PDU of interest in block 822, although the general process may continue with respect to other MAC PDUs corresponding to the SDU.

If in block 820 a NACK is received before the timer expires, the flow continues to block 824 where the MAC retransmission state machine 324 determines whether a retransmission count has reached a maximum value. If not, the flow continues to block 826 in which the retransmission counter is incremented by an amount corresponding to the fractional portion, up to one, of the HARQ packet that is to be retransmitted. In block 828, the MAC retransmission state machine 324 resends the MAC PDU or fractional part of it to the HARQ state machine 322 and PHY layer 320.

Then the UL service flow continues to the PHY layer of the client station in start block 610 of FIG. 6. In block 612, the HARQ state machine 322 receives one or more MAC PDUs from the MAC retransmission state machine 324. The HARQ state machine 322 puts one or more MAC PDUs into an HARQ packet in block 614. In block 616, the HARQ state machine 322 awaits a grant of an uplink allocation from the base station. When the allocation is granted, the HARQ start machine 322 re-sets a retransmission counter in block 618. In block 620, the HARQ state machine 322 passes the HARQ packet to the core physical layer 320 which transmits it over the wireless link to the core physical layer 316 of the base station. The retransmission counter value is incremented by the HARQ state machine 322 in block 622 by the fractional amount, up to one.

In block 624, the HARQ state machine 322 determines whether a maximum retransmission counter value has been reached. If not, the flow continues to block 626 in which the HARQ state machine 322 determines whether a subsequent allocation grant is received for retransmission of the HARQ packet, which provides an implicit message whether the HARQ packet has been delivered successfully. This is because when the maximum number of retransmission has not been reached in this case, the receipt of a grant specifying the transmission of new information is a confirmation that the previous HARQ packet was properly received and, thus, is an implicit ACK. The receipt of a grant specifying a request to repeat previously sent information is an indication that the previous HARQ packet was not properly received and, thus, is an implicit NACK. Alternatively, the HARQ state machine 322 receives an explicit ACK or NACK message from the base station (not shown in FIG. 6) so as to decide whether retransmission is necessary.

Referring back to block 626, if an allocation for retransmission is received, the flow proceeds to generate a bandwidth optimized HARQ retransmission, as specified by a multi-level NACK. Flow then goes back to block 620 where the HARQ state machine 322, again, passes the HARQ packet to the core physical layer 320 which transmits it over the wireless link to the core physical layer 316 of the base station. Conversely, if the allocation grant specifies the transmission of new information, the flow continues to block 628 in which the HARQ state machine 322 creates an internal pending ACK 336. In block 629, the HARQ state machine 322 sets a timer. If the timer expires before a MAC NACK 342 is received from the MAC layer retransmission state machine 312, the HARQ state machine 322 sends the internal ACK 336 to the MAC retransmission state machine 324 and the flow ends in block 630 for the HARQ packet of interest. On the other hand, if the MAC NACK 342 is received before the timer expires, the HARQ state machine 322 either sends an internal NACK 336 to the MAC retransmission state machine 324 or simply discards the internal pending ACK. Either way, the flow ends in block 630.

If the allocation specifies the retransmission of previously sent information, flow continues to block 620 and the processes of blocks 620, 622, 624 are repeated until the retransmission counter value (E) exceeds a predetermined value. For example, in one embodiment, the HARQ packet is sent to the base station up to four times. Once the retransmission counter value has reached its maximum value, the HARQ state machine 322 creates an internal pending ACK 336 in block 631. The HARQ state machine starts a timer in block 632. If the timer expires before receipt of a MAC NACK 342, the HARQ state machine 322 sends the internal ACK 336 to the MAC retransmission state machine 324. On the other hand, if the MAC NACK 342 is received before the timer expires, the HARQ state machine 322 either sends an internal NACK 336 to the MAC retransmission state machine 324 or simply discards the internal pending ACK. Either way, the flow ends in block 634.

On the base station side, the uplink flow in the physical layer begins in block 710 of FIG. 7. In block 712, the HARQ state machine 314 re-sets a retransmission counter value (E.) In block 714, the HARQ state machine 314 receives a good HARQ packet or a failure indication 332 from the core physical layer 316. If in block 716 a good HARQ packet was received, flow continues to block 718 where an internal ACK message 330 is sent to the MAC layer retransmission state machine 312, after which the flow ends in block 720 for the MAC PDU of interest. The transmission of the express internal ACK in block 718 obviates the need for the client station to send an explicit ACK message over the wireless link, thus preserving the precious wireless link resources.

If in block 716 the HARQ state machine 314 failed to properly receive the HARQ packet, the flow continues to block 722 in which the retransmission counter value is incremented by a fractional amount representing a fractional retransmission, up to one for a whole retransmission. In block 724, the HARQ state machine 314 determines whether a maximum retransmission counter value has been reached. If the maximum retransmission counter value has not been reached, the HARQ state machine 314 requests an uplink allocation over which the client station can retransmit the HARQ packet or fractional HARQ packet. The scheduler (not shown) by way of this request is made aware of the need for retransmission and, in one aspect, can indicate such to the client station by using, for example, the AI_SN toggle bit 340 specified in WiMAX. On the other hand, if in block 724 the maximum retransmission counter value has been reached, the state machine 314 sends an internal NACK 330 to the MAC layer retransmission state machine 312, once again obviating the need for such a message to be sent over the wireless link.

The successfully received MAC PDU is passed from the HARQ state machine 314 to the reassembly state machine 310. The reassembly state machine 310 recreates the SDU based on the MAC PDU and passes it to an application layer 308.

Figure 10:
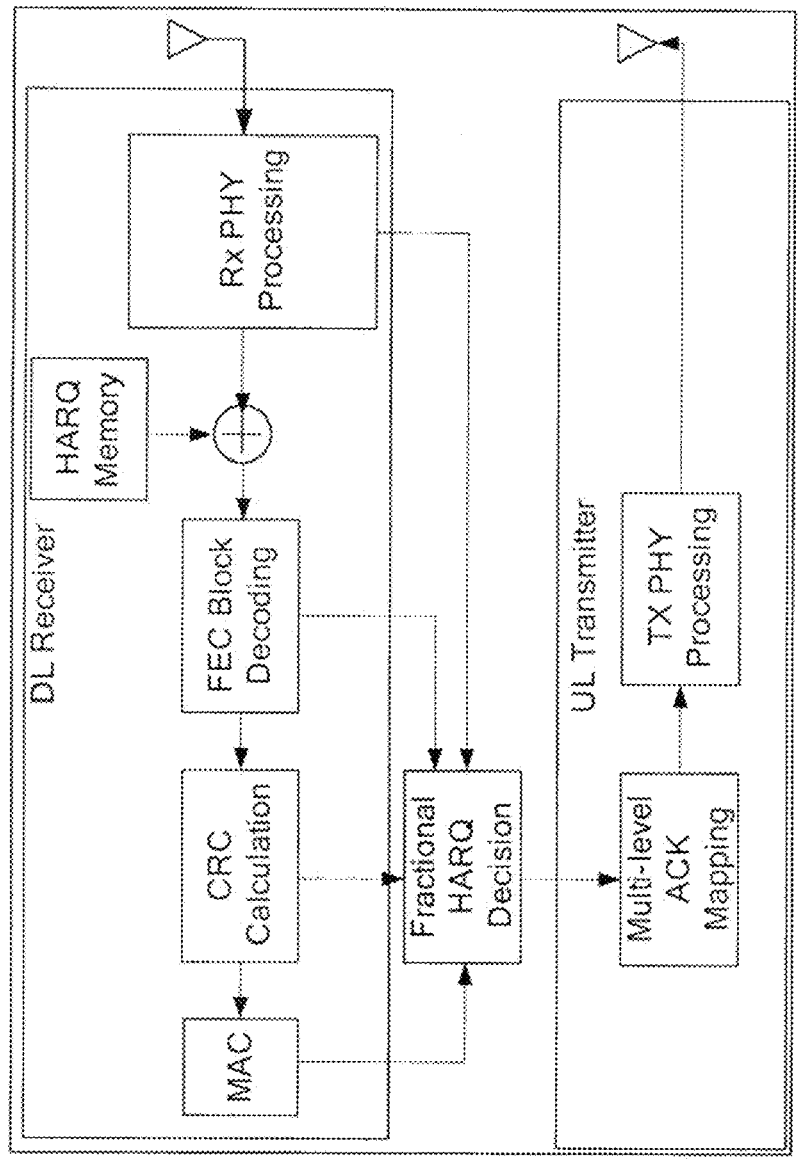
FIG. 10 provides an exemplary block diagram illustrating one embodiment of an apparatus implementing fractional or adaptive HARQ operation.

FIG. 10 is a block diagram illustrating one embodiment of an apparatus implementing fractional or adaptive HARQ operation. FIG. 10 illustrates a high-level overview of an operational flow within an apparatus using one embodiment of a fractional or adaptive HARQ signaling mechanism.

As shown in FIG. 10, a HARQ decision block is introduced to determine the value of an ACK message based on information such as statistical information from the MAC regarding previous HARQ channel successes and failures, or the CRC pass/fail metrics for the full HARQ channel and also partial CRC results that may contain per FEC block CRC values, or decoder-generated information about the HARQ channel (e.g., per FEC block pass/fail values, per FEC block quality readings computed during the decoding process), or accumulated CINR values for the HARQ channel, or a combination of some or all of the above.

In fractional HARQ operation, a receiver can signal a multi-level ACK/NACK signal instead of a single bit. One setting within the multi-level mapping can be used to signal successful reception (an ACK) and another setting can be used to signal that a full retransmission is required (a NACK), the other settings within the overall mapping can be used to signal that only a partial retransmission is required to successfully close the currently operating channel.

The receiver can use a variety of different information derived or otherwise obtainable at the receiver to determine the correct adaptive ACK/NACK signal. As discussed above, the information can include, for example, Accumulated CINR values, Partial CRC completion flags, Qualitative Decoder Feedback, and the like or some combination thereof.

In one embodiment, as each retransmission is received, the receiver can determine or otherwise compute an accumulated CINR value. In another embodiment, where there are several FEC blocks in a HARQ channel, one or more partial CRC completion flags can be used to indicate that one or several FEC blocks in a HARQ channel are successfully received. For many classes of decoders such as Turbo codes or LDPC codes a variety of metrics can be determined from the internal operation of the decoder. Such feedback can include success/failure determination or qualitative values signaling the perceived performance of the decoding.

In addition to the various forms of qualitative feedback described above, the following qualitative feedback matrices and features can be used.

1. For accumulated CINR metrics—If the accumulated CINR value indicates that the HARQ channel is close to decoding then the next transmission can be reduced in size.

2. For updated SNR—In UL HARQ the base station may receive SNR updates between scheduled grants to the UL HARQ transmitter. Based on these SNR updates, the size of the next re-transmission may be increased or decreased.

3. For Decoder metrics—This is information generated by FEC decoder circuitry indicating how close to decoding a particular FEC block is.

CRC checks—Main item here is the HARQ channel pass/fail CRC. It is also possible that if several FEC blocks are present in the HARQ channel and that each FEC block may have its own CRC check.

4. Statistics within the MAC over the course of time can indicate the general performance of a HARQ channel. Based on this statistical database and the current state of the HARQ channel a multi-level fractional HARQ signal can be generated.

The uplink channel can similarly benefit from the implementation of fractional HARQ signaling. For UL reception the situation is very similar to the DL case except that the UL receiver, or controller in communication with the UL receiver, is generally in charge of scheduling resource grants for the UL transmitter. As such, the result of advanced HARQ operation can be included within the control information for the next scheduling grant for each UL HARQ channel. In addition updated SNR information known by the serving base station about the UL transmitter can be used to further improve the fractional HARQ selection for the next UL transmission.

The HARQ feedback information supports multiple levels of fractional feedback. This type of feedback can be provided in both DL and the UL. Table 1 provides examples of several embodiments of multi-level signaling for fractional HARQ and the retransmission request associated with each signaling level. Although 3-level and 4-level signaling is illustrated in Table 1, a larger number of signaling levels can be used and may be advantageous with increasing block size.

TABLE 1

Fraction ACK/NACK Signal Formats

| Number of Levels | Level Interpretations |
|---|---|
| 3 | 0 NACK, Transmit Full amount of data |
|   | 1 Half__ACK, Transmit only ½ of the normal amount of data on the next TX |
|   | 2 Full__ACK, Transmit success |
| 4 | 0 NACK - Transmit Full amount of data |
|   | 1 Partial__ACK1 - Transmit ½ of normal |
|   | 2 Partial__ACK2 - Transmit ¼ of normal |
|   | 3 Full__ACK - transmit success |
| 4 | 0 NACK - Transmit Full amount of data |
|   | 1 Partial__ACK 1 - Transmit ⅔ of normal |
|   | 2 Partial__ACK 2 - Transmit ⅓ of normal |
|   | 3 FullACK - transmit success |

Figure 9:
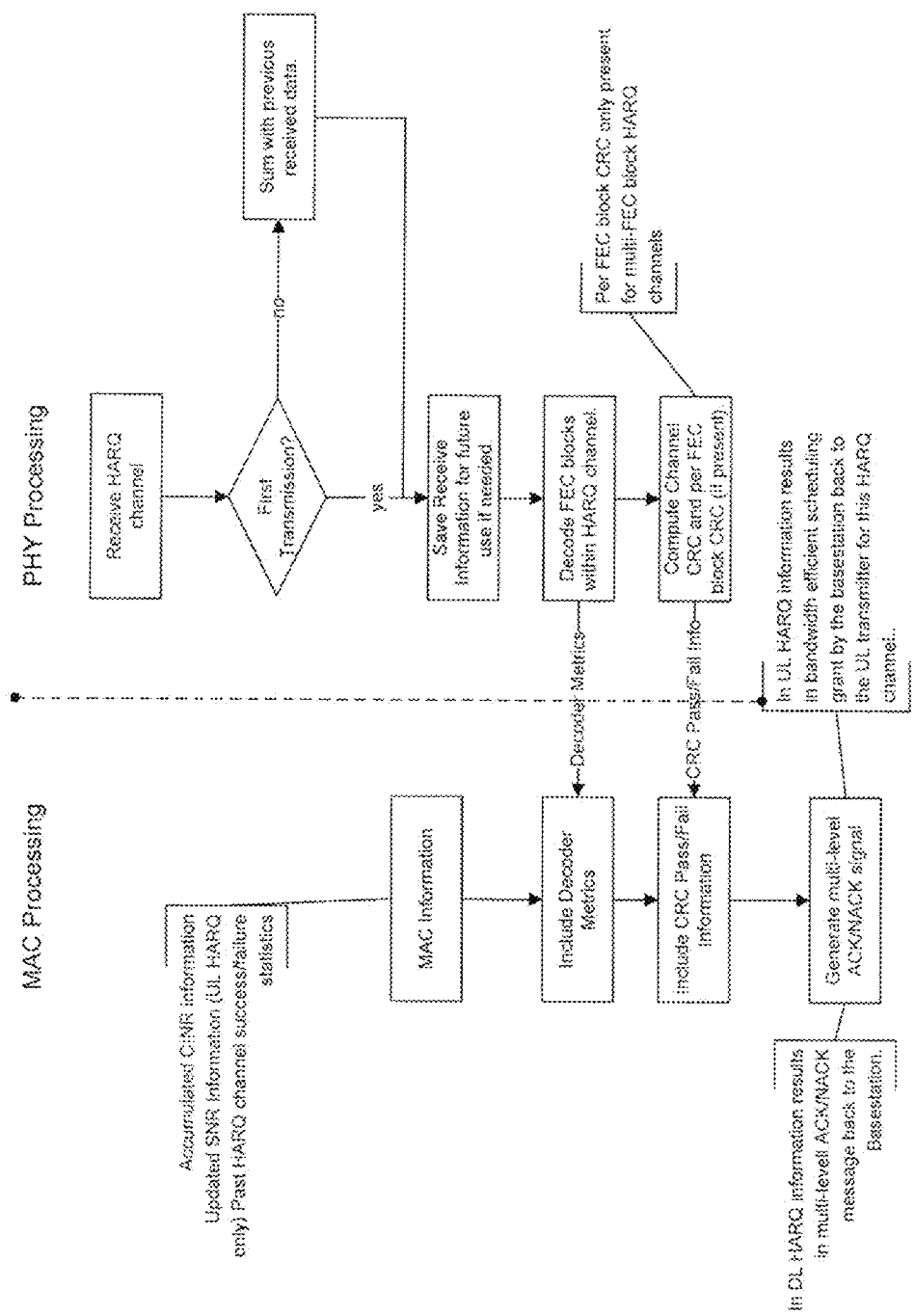
FIG. 9 is a signal flow diagram showing one embodiment of fractional HARQ processing within the receiving device.

FIG. 9 shows a detailed signal flow diagram using one embodiment of fractional or adaptive HARQ signaling mechanism. As seen in FIG. 9, various signal metrics can be used for HARQ signaling, such as accumulated CINR metrics, updated SNR, certain decoder metrics and so forth. Specifically, For accumulated CINR metrics, if the accumulated CINR value indicates that the HARQ channel is close to decoding, then the next transmission can be reduced in size. For updated SNR, in UL HARQ the base station may receive SNR updates in between schedule grants to the UL HARQ transmitter, and based on these SNR updates the size of the next re-transmission may be increased or decreased. For decoder metrics, i.e., information generated by CTC decoders, indication can be made, calculated, or otherwise generated to reflecting a measure of progress, for example, as to how close to decoding a particular FEC block is.

When multiple HARQ FEC blocks are allowed in one allocation (or called PHY PDU) in order to reduce allocation signaling (i.e., MAP) overhead, the fractional HARQ ACK/NACK can be implemented as a two-level scheme. A first level (level-one) can include a per-FEC block ACK/NACK, whereas a second level (level-two_can include, inside one FEC block, ACK/NACK more information to enable the transmit-side to make more intelligent decisions for adaptive retransmission.

In one particular embodiment of the per-FEC block ACK/NACK there may be a maximum of 8 or 12 FEC blocks per PHY PDU (one allocation). A 24-bit CRC may be implemented for each FEC block. A bit-map mechanism can be used to ACK/NACK FEC blocks to enable retransmitting only the corrupted blocks. Level-two ACK/NACK can be considered for those corrupted blocks, e.g., one bit for the good blocks, multiple bits for the bad blocks.

In UL HARQ, the base station can transmit the bit-map ACK/NACK as unicast data to the client station. In the complementary DL HARQ, it can be more challenging to pack more bits in the HARQ ACK/NACK channel. Embodiments for supporting the multiple level DL HARQ include the following. As the BS is the transmit side of DL HARQ, it can schedule a unicast UL data allocation for HARQ ACK/NACK and other UL data if any. The system may implement a code for the HARQ ACK/NACK channel subcarriers with maximally orthogonal messages. For example, a WiMax UL half-slot HARQ ACK/NACK channel can carry 6-bit data in a really robust way; 8-bit or even 12-bit in a fairly robust way depending on UL channel conditions. The BS should have relatively good knowledge about the UL channel condition as it needs the information to schedule the client station's UL MCS, therefore, there could be some adaptive ways to tie the number of bits and number of max FEC blocks per PHY PDU.

Embodiments of the actual UL ACK/NACK message include, for a ½ slot ACK 24 QPSK subcarriers or 48 bits to convey this information. For full slot feedback there can be 48 subcarriers or 96 values. These can be used to transmit 6 bits of information or one of 64 different values. For a ½ slot then for equivalent performance 32 values could be represented. In general, the ACK/NACK should be somewhat robust unless the channel conditions are known to be good.

Examples of possible mappings for FEC blocks and the associated multi-level fractional HARQ signaling include: For one FEC block implement a 3 valued signal (ACK, ½ACK and NACK); For two FEC blocks implement a 9 valued signal (3 valued signal for each FEC block); For three FEC blocks have a 27 valued signal, similar to the 32 values for half-slot fast feedback as mentioned above. Reasonable channel quality exists in this case; For four FEC blocks move to one bit per FEC block (4 bits or 16 valued signal); For more FEC blocks (up to 8 as a max) implement the one bit per FEC block.

In the 4 FEC block or more case, the per FEC block CRC flag may be used to generate the feedback.

As the number of FEC blocks in the HARQ channel increases, the channel quality is typically also increasing, generally meaning that more UL ACK information can be transmitted in the same space. For example, a communication link between two wireless devices using an 8 FEC block HARQ channel can typically tolerate an 8 bit feedback using QPSK and a ⅙ coding.

In operation, with the fractional HARQ signal mechanism as demonstrated in FIGS. 9-10, the system (from either the base station or client station perspective, and in either DL or UL operation) can be implemented and work as illustrated in FIGS. 2-8 according to various embodiments.

In one aspect, incremental redundancy (IR) HARQ is used for fractional HARQ signaling. IR HARQ makes use of the fact that by using FEC, a receiver can accurately reproduce the transmitted information, even if some PHY layer errors occur and even if only a portion of the PHY layer bits are transmitted. Instead of sending an entire FEC block, initially only a portion of a FEC block is transmitted, thereby using less wireless link resources. According to one implementation, the retransmitted portion is configured to be sufficient for decoding the block at a desired probability level. Alternatively or additionally, if the block was not received properly, instead of sending a simple repeat of the same portion, progressive parity packets are sent in each subsequent transmission of the packet. The decoder then combines all the transmissions and decodes the packet at a lower code rate.

The IR schemes can be broadly classified under two categories: a) partial IR where each re-transmission is self decodable (referred to as HARQ-type-III) as described above and b) full IR where each transmission is not self decodable (referred to as HARQ-type-II) and an additional retransmission is required. Fractional HARQ signaling can be used with either HARQ type II or HARQ type III In addition, fractional HARQ signaling can be used with both systematic and non-systematic HARQ schemes.

With fractional HARQ signaling, a mechanism is provided to allow the retransmission to more closely match the receiver's need for energy with the additional energy sent over the wireless link. In one aspect, the receiver sends the transmitter qualitative feedback which indicates to the transmitter an approximate amount of additional energy that the receiver needs to successfully decode the transmission. Rather than retransmit the original message at the same signal level, the transmitter may send a lesser amount of energy and/or a smaller message based on the qualitative feedback. The reduced transmission conserves the precious wireless link resources for use by other links.

A mechanism for fractional HARQ signaling and apparatus for fractional HARQ signaling are described herein.

As used herein, the term coupled or connected is used to mean an indirect coupling as well as a direct coupling or connection. Where two or more blocks, modules, devices, or apparatus are coupled, there may be one or more intervening blocks between the two coupled blocks.

The steps of a method, process, or algorithm described in connection with the embodiments disclosed herein may be embodied directly in hardware, in a software module executed by a processor, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

The methodologies described herein may be implemented by various means depending upon the application. For example, these methodologies may be implemented in hardware, firmware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying or otherwise encoded with instructions may be used in implementing the methodologies described herein. For example, software codes may be stored or otherwise encoded in a memory and executed by a processor. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored.

In one or more exemplary embodiments, the functions described may be implemented in hardware, software, firmware, or any combination thereof. If implemented in software, the functions may be stored as one or more instructions or code on a computer-readable medium. Computer-readable media includes physical computer storage media. Transmission media includes physical transmission media. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The above description of the disclosed embodiments is provided to enable any person of ordinary skill in the art to make or use the disclosed embodiments. Various modifications to these embodiments will be readily apparent to those of ordinary skill in the art, and the generic principles defined herein may be applied to other embodiments without departing from the scope of the disclosure.

What is claimed is:

1. A method of error control comprising:
    sending a qualitative feedback metric indicating an accuracy with which a receiver decoded encoded data of a received packet; and
    receiving, in response to the sent qualitative feedback metric, a retransmission of a fractional portion of the received packet.

2. A method of error control comprising:
    determining a fractional NACK message based on decoded data of a received packet;
    sending the determined fractional NACK message; and
    receiving a fraction of the received packet as indicated by the determined fractional NACK message.

3. A base station comprising:
    a processor; and
    a memory,
    the processor and memory operable to:
        transmit a packet;
        receive a qualitative feedback metric indicating a receipt accuracy of the transmitted packet; and
        transmit a fraction of the packet according to the received qualitative metric.

4. A client station comprising:
    a processor; and
    a memory,
    the processor and memory operable to:
        receive a packet;
        determine a qualitative feedback metric of accuracy of the received packet;
        transmit the qualitative metric; and
        receive a fraction of the received packet as indicated by the determined qualitative metric.

5. A method of error control, the method comprising:
    receiving a packet of information over a wireless link from a transmission source;
    decoding the received packet to recover data;
    determining whether the data was successfully recovered;
    generating a fractional HARQ acknowledgement signal;
    communicating the fractional HARQ acknowledgement signal to the transmission source; and
    receiving, from the transmission source in response to the fractional acknowledgement signal, a retransmission of a fraction of the packet of information.

6. A method of error control, the method comprising:
    decoding a received packet;
    generating a multi-level ACK signal based on the decoding;
    transmitting the multi-level ACK signal; and
    receiving, in response to the multi-level ACK signal, a retransmission of a fractional portion of the received packet.

7. The method of claim 1 wherein the qualitative feedback metric indicates an approximate amount of additional energy needed to successfully decode the encoded data of the received packet.

8. The method of claim 1 further comprising:
    combining the fractional portion of the received packet with the received packet.

9. The method of claim 1 further comprising:
    determining the qualitative feedback metric based on the performance of forward error correction.

10. The method of claim 1 further comprising:
    determining the qualitative feedback metric based on a signal-to-noise ratio.

11. The method of claim 1 further comprising:
    determining the qualitative feedback metric based on a carrier-to-interference-and-noise ratio.

12. The method of claim 1 wherein the qualitative feedback metric comprises a fractional ACK/NACK signal.

13. The method of claim 1 wherein the qualitative feedback metric comprises a qualitative feedback matrix.

14. The client station of claim 4 wherein the processor and memory are further operable to:
    combine the fraction of the received packet with the received packet.

15. The client station of claim 4 further comprising:
    wherein the processor and memory are further operable to:
        combine the fraction of the received packet with the packet.

16. The method of claim 5 further comprising:
    combining the fraction of the packet of information with the packet of information.

17. The method of claim 6 further comprising:
    combining the fractional portion of the received packet with the received packet.

18. The method of claim 6 wherein the multi-level ACK signal has 3 levels.

19. The method of claim 6 wherein the multi-level ACK signal has 4 levels.

20. The method of claim 6 further comprising:
    decoding the fractional portion of the received packet;
    generating an accumulated metric based on the decoding of the received packet and based on the decoding of the fractional portion of the received packet;
    transmitting the accumulated metric; and
    receiving, in response to the accumulated metric, a retransmission of a subsequent fractional portion of the received packet.

* * * * *